United States Patent [19]

Gasper

[11] 4,315,703
[45] Feb. 16, 1982

[54] SEALING METHOD USING LATEX-REINFORCED POLYURETHANE SEWER SEALING COMPOSITION

[75] Inventor: Alton J. Gasper, Minneapolis, Minn.

[73] Assignee: Minnesota Mining and Manufacturing Company, Saint Paul, Minn.

[21] Appl. No.: 51,878

[22] Filed: Jun. 25, 1979

[51] Int. Cl.³ .................... C08G 18/12; C08G 18/14; E02B 3/16; E02D 3/12

[52] U.S. Cl. .................................. 405/264; 166/295; 260/29.2 TN; 260/29.6 NR; 405/52; 405/135; 405/270

[58] Field of Search ............... 260/29.2 TN, 29.6 NR; 166/295; 405/264, 270, 52, 135; 106/33

[56] References Cited

U.S. PATENT DOCUMENTS

| | | | |
|---|---|---|---|
| 3,190,847 | 6/1965 | Mitchell et al. | 260/29.6 NR X |
| 3,223,163 | 12/1965 | Koch et al. | 405/264 |
| 3,730,271 | 5/1973 | Gall | 405/264 X |
| 3,798,186 | 3/1974 | Nakade et al. | 405/264 X |
| 3,894,131 | 7/1975 | Speech | 405/264 X |
| 3,943,078 | 3/1976 | James | 405/264 X |
| 3,951,898 | 4/1976 | Paul | 260/29.6 NR |
| 3,953,975 | 5/1976 | Busler et al. | 405/264 |
| 3,993,618 | 11/1976 | Muck et al. | 260/29.6 NR X |
| 4,061,618 | 12/1977 | Stanley et al. | 260/29.6 NR X |
| 4,114,382 | 9/1978 | Kubens et al. | 405/264 |

*Primary Examiner*—Stephen J. Novosad
*Attorney, Agent, or Firm*—Cruzan Alexander; Donald M. Sell; Richard Francis

[57] ABSTRACT

A sealing composition prepared by reacting water-soluble polyurethane prepolymer with water containing latex to provide a gelled viscous mass which will cure to a cross-linked latex-reinforced gel capable of preventing or inhibiting leakage in various structures, when applied at the site of the leakage in the viscous state. The sealing composition of the invention also preferably contains up to 60% by weight of fillers of the total weight of the composition to provide a high compressive strength, shrink-resistant sealing composition.

7 Claims, 7 Drawing Figures

SEALING METHOD USING LATEX-REINFORCED POLYURETHANE SEWER SEALING COMPOSITION

BACKGROUND OF THE INVENTION

1. Field of the Invention

This invention relates to a two part curable latex-reinforced polyurethane sealing composition useful for sealing structures, such as sewer lines, to minimize or prevent water leakage through voids, joints, cracks, fissures or other openings therein. In another aspect, it relates to a method for sealing such structures with said sealing composition. In yet another aspect it relates to the structure so sealed.

2. Background of the Prior Art

There is a host of water-bearing or holding structures disposed above or beneath ground level, such as sewer lines, aqueducts, tunnels, wells, settling ponds, and basements of buildings, made of materials such as siliceous materials (e.g., concrete, brick and mortar), plastics (e.g., polyvinylchloride), cast iron, or wood (e.g., cypress or cedar). Because of the nature of such construction material or the manner of constructing such structures or their locations, such structures inherently have, or develop with time, various discontinuities such as openings, cracks, fissures, joints, or the like which provide an entry or pathway for the undesirable ingress or egress of water into or from such structures. Even hairline cracks or pin-hole size openings in an otherwise sound or water-impervious structure can result in a damaging and costly leakage from a temporary or permanent water source.

For example, sewer lines made of concrete (a brittle and unyielding construction material) normally experience the incursion or leakage of ground water via the interfaces defined by the abutting components or members of the structure, or via joints, holes, cracks, or fissures in the structure. Such leakage is generally tolerable in sewers up to a certain point without affecting the usefulness and serviceability of the structure. However, when a heavy rainfall occurs, a large amount of surface or run-off water penetrates the soil and accumulates in excavations surrounding the sewer line, raising the exterior hydrostatic head of the water, until the water leakage or incursion into the structure increases to an undesirable and even intolerable level. Since water has a propensity to find the path or drainage area of least resistance, the incursion of water into the sewer system may reach such high levels that the capacity of the downstream sewage treatment reservoir or pond is exceeded and untreated or insufficiently treated sewage is discharged to rivers or lakes causing pollution thereof. The water resulting from such incursion may also cause the flooding of basements of buildings.

Water-holding structures, such as concrete irrigation water courses or aqueducts or dikes, bearing a static head or flowing stream of water, also experience leakage due to holes, cracks, fissures, and the like, such leakage being an uneconomical loss of water as well as hazardous in many circumstances.

A host of sealing compositions and sealing techniques have been used to prevent the ingress or egress of water into or from such structures. Some sealing materials, such as mortar, shrink upon setting and curing to create cracks or fissures. Some sealants which are pumped into soil surrounding the structure to be sealed are limited to fine grain sand or soil. Other sealing materials must be placed in a dry environment or used in a dry, powdered form and they, consequently, lack mobility and cannot be extensively dispersed or placed in large leakage or drainage areas. Some sealing compositions require heat, or contain water-immiscible hydrocarbon solvents, and thus, their application is costly and generally limited to dry, clean environments. Other multi-component systems require careful metering and mixing or have a limited pot life. The application equipment for many of the prior art sealing techniques is cumbersome and costly and many of these techniques are limited only to areas which are readily accessible, easily dried, and suitable for cleaning.

Curable polyurethane compositions comprising isocyanate-terminated prepolymers based on polyols, have been disclosed as sewer grouting compositions and sealing agents for sewers and similar uses (see U.S. Pat. No. 3,985,688, Canadian Pat. No. 1,035,521 and British Pat. Specification No. 1,486,232). Also known is the use of curable isocyanate prepolymers with water to consolidate soil (see U.S. Pat. No. 3,719,050). These prior isocyanate-terminated prepolymer compositions frequently have limited utility, however, because of one or more reasons. Some may cure to form a cured tough, highly cohesive mass making it difficult to remove contacting equipment after curing. Others may produce relatively compressible cured compositions or foams which do not have sufficient compressive strength to withstand the pressures encountered in use conditions, e.g., when used to seal a sewer. Others may undergo dramatic volume fluctuations with changing environmental conditions, such as changes in moisture conditions. Such volume changes make it difficult to maintain an adequate seal of a leaking sewer line.

Perhaps the most successful commercially acceptable composition employed as a sewer sealing composition is that based upon acrylamide which is used typically as a liquid which is pumped with specially designed equipment into the site of the leak and into the surrounding soil to form a cured gel which inhibits or prevents leaking. In fact, much of the sewer sealing equipment employed in the United States and in other countries has been designed to utilize acrylamide type sealing compositions. Such compositions are desired, not only for their ability to appropriately seal leaks in sewers and in other areas, but also because of their compatible viscosity range which is easily adjustable, providing an easily pumpable mixture, their desirable cure rate and their physical properties achieved upon curing.

The cured acrylamide material generally has an acceptable compressive strength capable of withstanding the compressive forces encountered in sealing situations such as in sewers and an acceptable resistance to shrinking which is required for the cured material to function properly as a sealant as hydrological conditions vary at the sealing site. Additionally, the acrylamide type sealing compositions will cure in a reasonably brief period of time without requiring prolonged delays so that equipment may be advanced to new sealing locations. This is important when sealing sewer lines, for example, where a sewer packer is employed utilizing an inflatable sleeve which is required to be inflated within the sewer line being sealed until the curing of the sealant has been accomplished.

Additionally, acrylamide-type sealing compositions will cure to a somewhat weakly cohesive mass which permits easy removal of the contacting sealing equipment, e.g., the sewer packer, so that it may be moved to a new location without difficulty.

While the acrylamide-type sealing compositions have all these desirable properties and have proven to be extremely valuable in such applications, they have several serious defects including a serious toxicological problem which may lead to its being banned for sealing sewers in the United States and in other concerned countries. This situation requires the replacement of the acrylamide-type sealants with a suitable substitute.

While many sealing compositions are known, it is highly desirable to replace the acrylamide-type sealing compositions with one having the same or similar physical properties, both in the liquid state and in the cured state, without the adverse toxicological problems. The present invention not only accomplished this result, but it provides a sewer sealing composition which is better than the acrylamide-type sealants.

SUMMARY OF THE PRESENT INVENTION

The sealing composition of the present invention is a two part composition which is cured at the site of the leak to provide a latex-reinforced polyurethane hydrogel or gel. Unlike the acrylamide-type sealants, the sealant of the present invention is not required to migrate into the soil surrounding a leaking sewer line. Such migration into the soil is required for acrylamide-type sealant because of its inherent weakness which, when applied to the leaking line without entering the surrounding soil, is generally insufficient to prevent leakage. By contrast the latex-reinforced hydrogel of the present invention has sufficient strength to prevent or inhibit leaking without requiring penetration or migration into the surrounding soil. Additionally, the latex-reinforced polyurethane hydrogel sealants of the present invention undergo a much lower shrinkage than cured acrylamide-type sealants, making the hydrogels of the present invention much more adaptable to changes in hydrolytic conditions. Additionally, cured acrylamide sewer grout will crack as it shrinks, making its effectiveness as a sealant very limited after shrinkage. By contrast, the cured sealants of the present invention have relatively little or no cracking or shrinkage. Furthermore, application of the sealing composition of the invention is much less troublesome than applications of the acrylamide-type sealants in that the acrylamide-type sealants create quantities of steam on mixing and reaction at the location of the leak, while the compositions of the present invention do not. The creation of steam at the location of the leak is very undesirable since it interferes with the use of remote viewing equipment such as a television camera.

The preferred cured compositions of the present invention will have a compressive strength of at least 20 psi and a percent shrinkage or a volume reduction of less than 30%, preferably less than 20%, in use conditions as the environment may vary.

Specifically, the method of the present invention comprises substantially simultaneously applying at the locus of leakage (1) a fluid mixture comprising water-soluble polyurethane prepolymer, and optionally water-miscible, organic solvent (2) sufficient polymeric latex containing particulate polymeric material having an average particle size in the range of about 0.01 to about 10 microns, preferably 0.1 to 0.3, to provide a weight ratio of prepolymer to polymeric material in latex form of about 100:1 to 1:1 (preferably 90:1 to 5:1); and (3) sufficient water to provide a gelled mass having a viscosity in the range of about 5 to about 1,000 cps when measured with a Brookfield RVT Viscometer at 25° C. using a standard No. 3 spindle rotated at 20 rpm, and permitting the components to react.

The prepolymer is characterized by having terminal isocyanate groups formed by reacting polyether polyol having at least two terminal hydroxyl groups and a number average molecular weight between about 3,000 and 20,000, preferably 5,000 to 10,000, and having random ethylene oxide units and higher alkylene oxide units in a mol ratio of ethylene oxide to higher alkylene oxide of 1:1 to 4:1, and sufficient polyisocyanate compound having at least two terminal isocyanate groups to provide an NCO:OH ratio of about 5:1 to about 1.05:1. The higher alkylene oxide is selected from the group consisting of propylene oxide, butylene oxide, pentylene oxide, hexylene oxide and mixtures thereof.

Specifically, the composition of the present invention is a two-part curable composition suited when mixed for sealing water-bearing and water-holding structures. One part, hereinafter referred to as "Part A", comprises a fluid mixture comprising water-soluble, preferably non-crystallizing polyurethane prepolymer having terminal isocyanate groups, defined above, and water-miscible organic solvent, if needed, to render the prepolymer fluid, and a second part, hereinafter referred to as "Part B", comprising sufficient aqueous polymeric latex containing particulate polymeric material having an average particle size in the range of about 0.01 to about 10 microns, preferably 0.1 to 0.3 microns, to provide a weight ratio of prepolymer to polymeric material latex in the range of about 100:1 to 1:1 (preferably 90:1 to 5:1); and sufficient water to provide a weight ratio of water to prepolymer on the order of 5:1 to 20:1 (preferably 10:1 to 15:1) and to provide a gelled mass having a viscosity in the range of about 5 to about 1,000 cps when measured with a Brookfield Viscometer at 25° C. using a standard No. 3 spindle rotated at 20 rpm.

The preferred sealing composition of the invention also includes up to 60 parts by weight of fillers per 100 parts total sealing composition, preferably from about 5 to about 20 parts by weight per 100 parts. Such fillers may be selected from organic fillers and inorganic fillers having a particle size less than about 500 microns, preferably from 1 to about 50 microns, and a specific gravity in the range of about 0.1 to 4.0, preferably 1.0 to 3.0.

DRAWING

Examples of known equipment suitable for practicing the method of this invention employing the composition of the present invention for sealing a joint in a concrete sewer line are illustrated in the accompanying drawings in which.

Figure 1:
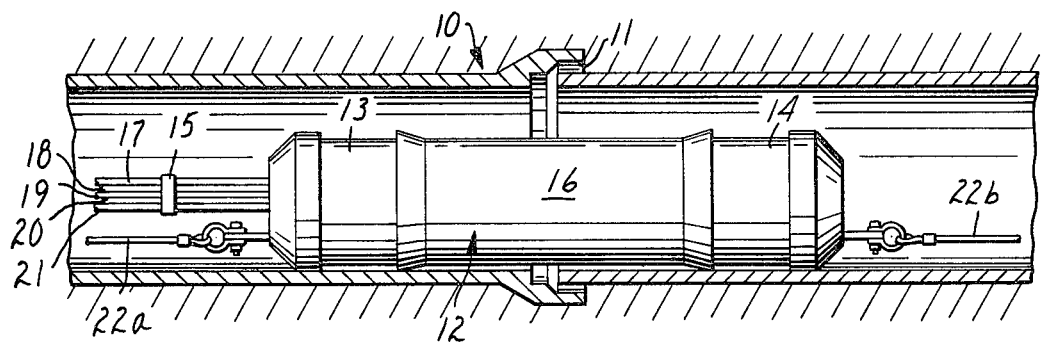
FIG. 1 is a view in elevation of a three element packer disposed in a sewer line (shown in cross-section) in the vicinity of a joint in the line.

Referring to the accompanying drawing and initially to FIG. 1, reference number 10 denotes generally a sewer line having a joint 11 through which the incursion of water into the sewer line is occurring or may occur. Disposed within the line 10 is a packer 12 with three inflatable diaphragm sections 13, 14, 16, shown in FIG. 1 in their collapsed conditions, which can be inflated by means of air. The air used to inflate the packer diaphragm sections is delivered to the packer by means of the hoses 17, 18, 19, each hose serving to inflate one of the packer diaphragm sections. The prepolymer mixture of this invention is delivered to the packer via hose 20 and the latex contained in sufficient water required for reaction of the prepolymer via hose 21, all of the hoses being held together by band 15. The packer 12 can be positioned by means of cables 22a, 22b attached to the packer and to an external means for moving the packer, e.g., winches.

Figure 2:
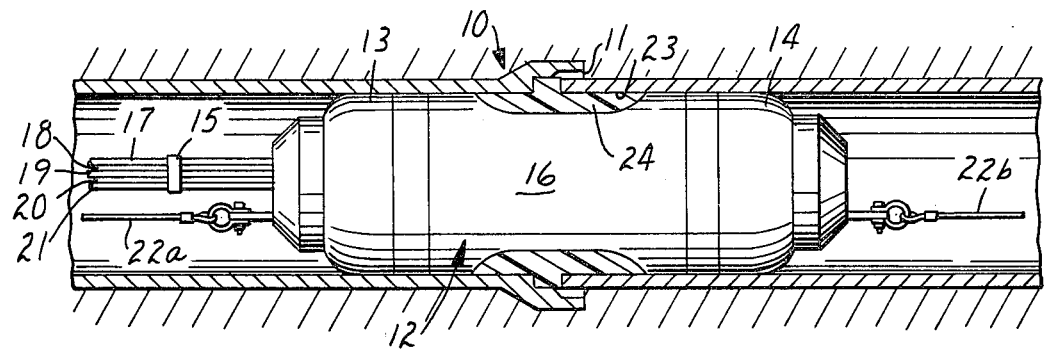
FIG. 2 is a view of the packer of FIG. 1 expanded at its ends to isolate the joint and form a circular cavity at the locus of the joint which is filled with a gelled mass.

In FIG. 2 the outer diaphragm sections 13, 14 of the packer 12 have been inflated, isolating joint 11 and forming a circular or annular cavity 23 at the locus of the joint. The sealing composition of this invention is injected in a controlled amount into the cavity 23 together with water, for example, by spraying separate streams of these materials into the cavity in such a manner as to cause the two sprays to impinge, thus ensuring rapid admixture and reaction.

Figure 3:
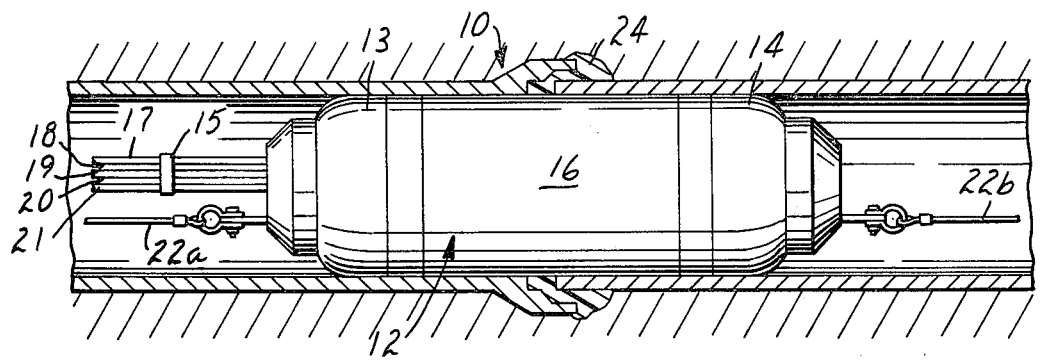
FIG. 3 is a view of the packer of FIG. 1 fully expanded to force the gelled mass from the cavity into the joint.

In a short time, e.g., 30 seconds after the injection, a gel 24 begins to form in the cavity 23 and the center section 16 is inflated as shown in FIG. 3, forcing the still reacting gel into joint 11. After about 5-2000 seconds, the gel 24 will have thickened to its maximum viscosity, in the range of 5-1000 cps, forming gelled mass 25 which seals joint 11. The packer 12 can be deflated and moved by cables 22 to the next joint where the operation is repeated.

Figure 4:
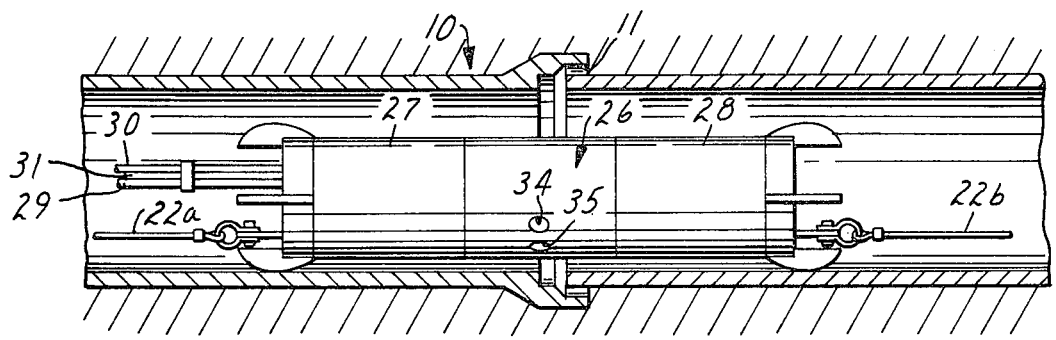
FIG. 4 is a view in elevation of a two element packer disposed in a sewer line (shown in cross-section) in the vicinity of a joint in the line.
Figure 5:
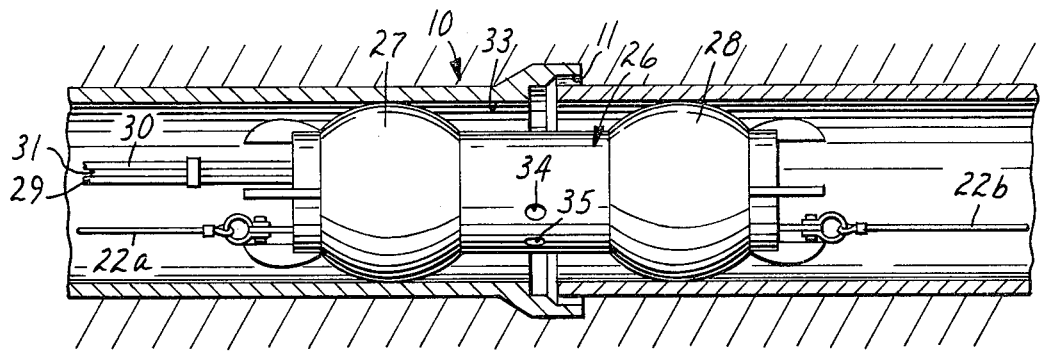
FIG. 5 is a view of the two element packer of FIG. 4 expanded at its ends to isolate the joint and form a circular cavity between the expanded packer surface and the inner sewer line surface.

Referring now to FIG. 4, a sewer packer 26 is shown with two inflatable diaphragm sections 27 and 28 in their collapsed condition. Inflatable diaphragms 27 and 28 may be inflated by means of air delivered to the packer by means of air hose 31. The prepolymer mixture of this invention may be delivered by hose 30 and the latex and optional filler contained in sufficient water required for reaction of the prepolymer delivered via hose 29. The packer may be positioned by means of cables 22a, 22b attached to the packer and to an external means for moving the packer, e.g., winches.

Figure 6:
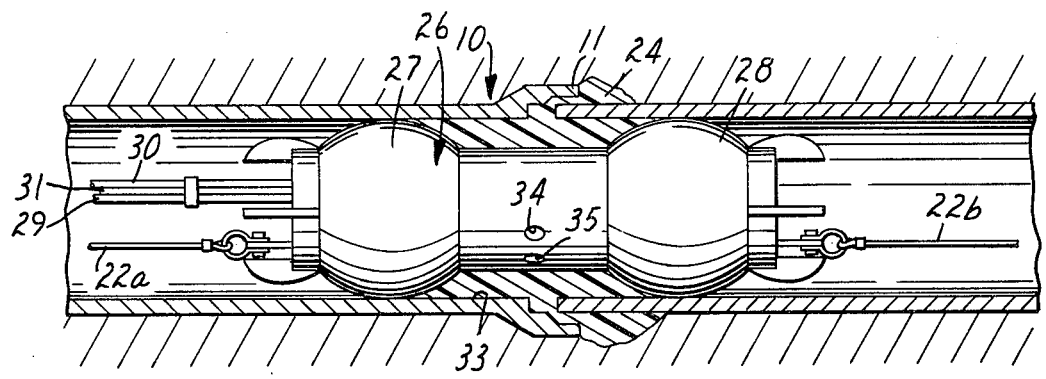
FIG. 6 is a view of the two element packer of FIG. 4 wherein a gelled mass has filled the cavity described in FIG. 5.
Figure 7:
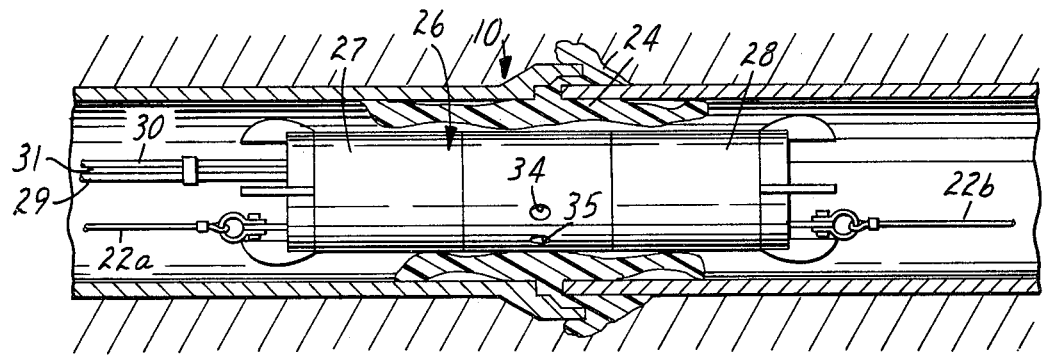
FIG. 7 is a view of the unexpanded packer of FIG. 4 after permitting the gelled material to flow into the joint area and in the surrounding soil.

In FIG. 6, the inflatable elements 27, 28 of the packer 26 have been inflated isolating joint 11 and forming a circular or annular cavity 33 at the locus of the joint between the packer wall and the inner wall of the sewer line. A controlled amount of the sealing composition of this invention may be injected into the cavity 33 with the water, latex and optional filler material. These ingredients are introduced by pressure controlled flow through the separate packer orifices 34 and 35, one orifice for each of the prepolymer and latex, water and optional filler components. When the streams comingle, a reaction occurs, forming the gell-forming sealing composition.

In a short time, 10-100 seconds after the injection, a gel 24 begins to form in the cavity 33 and is forced into joint 11 and a minor amount of surrounding soil. After about 20-120 seconds, depending on a preselected gel time, the packer 26 may be deflated and moved by means of cables 22 to the next joint and the operation repeated.

DETAILED DESCRIPTION OF THE PRESENT INVENTION

Water-soluble isocyanate-terminated prepolymer useful in this invention may be expressed in terms of the formula: $R[(R'O)_a\text{-}C(O)NH\text{-}R''(NCO)_b]_c$ wherein R is an active hydrogen-free residue of a polyether polyol, e.g., ethylene glycol, glycerol, or 1,1,1-trimethylolpropane, $(R'O)_a$ is a hydrophilic poly(oxyalkylene) chain having a plurality of randomly distributed oxyethylene and high oxyalkylene units. The subscript "a" is the number of oxyalkylene units in the poly(oxyalkylene) chain, this number being sufficient to impart water-solubility and preferably non-crystallinity to the prepolymer. The moiety —C(O)NH— together with the adjacent oxygen atom of the poly(oxyalkylene) chain is a carbamate (or urethane) group resulting from the reaction of a hydroxy group from polyether polyol precursor with an isocyanate moiety from a polyisocyanate precursor. R'' is a residue or nucleus of the polyisocyanate precursor, and is preferably an aromatic nucleus, e.g., tolylene, and "b" is an integer, generally 1-5, where "b" is the number of isocyanate moieties of the polyisocyanate precursor. The subscript "c" is a number equal to the functionality or number of the active-hydrogen atoms in the polyether polyol, and generally "c" will be 2-6. The terminating isocyanate groups can react with water, resulting in the formation of a gelled mass.

Preferred water-soluble prepolymers within the scope of this invention are those of the formula:

where R, R'', and "c" are as defined above, "d", "e" and "f" are integers such that the ratio of (d+f):e is 1:1 to 4:1.

When these prepolymers are used in the application of this invention, the polyurethane prepolymer reacts with the water mixed with the prepolymer, forming in situ a cross-linked, cured poly(urethane-urea) polymer gel. The mixture of water and prepolymer initially forms a viscous mass, typically having a viscosity of about 5 to 10 cps when measured as described above, which, in a very short period of time, cures to form a cross-linked gelled mass having an infinite viscosity. Depending upon the amount of latex, fillers and other additives, the initial viscosity of the viscous mass typically varies between 5 and 1000 cps, the viscosity being higher at higher loadings of additives. Care should be taken to maintain the viscosity at a level which permits pumping the viscous mass, e.g., from a sewer packer into the leaking structure being sealed.

Sealing compositions of this invention, when reacted with water form a gelled mass in a very short time, e.g., about 5-200 seconds, although the time necessary to gel will vary depending on the ambient temperature, with a longer cure time usually being necessary in colder conditions. The curing time may be extended or shortened by the addition of an appropriate agent. For example, the curing time may be extended by the addition of minor amounts of the aqueous solution of organic acids, e.g., from about 5% to about 50% by weight of 0.1 N oxalic acid or acetic acid. The curing time may be shortened by the addition of from about 1% to 10% by weight of dicyanoethylated polypropylene diamine.

Sealant compositions of this invention form gels which exhibit good compressive strength and shrink-resistance, maintaining a seal in a joint through cycles of expansion and contraction as well as cyclical changes from wet to dry conditions. It has been found that the mixture of prepolymer, latex of particulate organic material, and water reacts to produce a high compressive strength gel which will not shrink excessively and pull away from the sealed structure upon dehydration of the gel. The gel also has a substantial resistance to the chemical, physical, and biological activity of sewage.

The isocyanate-terminated prepolymers used in this invention can be tailored in structure to obtain controlled water-solubility in order to attain practical reaction times and achieve desired physical properties in the gelled mass.

The preparation of isocyanate-terminated prepolymers, such as those used in the sealing composition of this invention, and the reaction thereof with water to from a polyurea, is disclosed in the art, e.g., U.S. Pat. Nos. 2,726,219, 2,948,691, 3,719,050, 3,985,688 and Canadian Patent No. 1,035,521 and "Polyurethanes:Chemistry and Technology" by Saunders and Frisch, Part I, Interscience Pub., N.Y. (1962).

The urethane prepolymers used in this invention can be prepared by reacting an aliphatic or aromatic polyisocyanate with a polyoxyethylene polyol using an NCO/OH equivalent ratio in the range of about 5:1 to about 1.05:1.

To insure water-miscibility, the polyether polyol will generally have a molecular weight range of about 3,000–20,000, preferably 5,000 to 10,000. Commercially available polyol precursors useful in making the above described water-soluble isocyanate-terminated prepolymers are the hydrophilic polyols, e.g., "Carbowax". The degree of overall hydrophilicity of the prepolymeric mixtures can be modified by using small amounts of poly(oxyethylene-oxypropylene) polyols sold under the trademark "Pluronic", such as Pluronic-L35, F38, and P46, or hydrophilic polyols with heteric oxyethylene-oxypropylene chain sold as Polyol Functional Fluids, such WL-580, WL-600, and WL-1400.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-isocyanate, and 20 weight percent of tolylene-2,6-isocyanate; a 65:35 blend of the 2,4- and 2,6-isomers is also useable. These polyisocyanates are commercially available under the trademark "Hylene" TM, "Nacconate" 80, and "Mondur" RD-80. Other useable polyisocyanate compounds which can be used are other isomers of tolylene diisocyanate, hexamethylene-1,6-diisocyanate, diphenyl-methane-4,4'-diisocyanate, m- or p-phenylene diisocyanate and 1,5-naphthalene diisocyanate. Polymeric polyisocyanates can also be used, such as polymethylene polyphenyl polyisocyanates, such as those sold under the trademarks, "Mondur" MRS, and "PAPI". A list of useful commercially available polyisocyanates is found in Encyclopedia of Chemical Technology by Kirk and Othmer, 2nd Ed., Vol. 12, pages 46, 47, Interscience Pub. (1967).

The polyurethane prepolymers of the present invention are liquids or greasy or pasty solids at room temperature. They are reactive in the presence of water to form a cross-linked, water-insoluble, water-containing gelatinous mass having a high degree of elasticity. Reaction times to convert the prepolymer to the gel in the presence of water may be on the order of less than a minute to several hours. If needed, the polyurethane prepolymer may be dissolved in a suitable water-miscible organic solvent to facilitate handling in sealing equipment such as a sewer packer.

The solvents which may be used if needed to dissolve the prepolymers are water-miscible, polar organic solvents which are preferably volatile at the ambient conditions of the environment where the sealing composition is to be used. The solvent chosen should be such that the resulting solution of prepolymers and solvent will not freeze at the ambient conditions present in the environment where the structure to be sealed is located. For example, where the ambient temperature is about 50° F., a solution of about 60–90 weight percent of propolymer solids in dry acetone is a very effective sealant composition. Other useful water-miscible solvents include methyl acetate, tetrahydrofuran dimethyl formamide ethylene glycol monoethyl ether acetate (sold under the trade designation "Cellosolve" acetate) and diethyl acetal.

The water-reaction product of the prepolymer is a gelatinous mass, sometimes referred to herein as a gel or hydrogel. While the reaction produces by-product carbon dioxide, which normally produces a foamed structure in a cured polyurethane, foaming of the gelatinous mass is normally not noted since the amount of carbon dioxide by-product produced will generally be readily dissolved in the water contained within the gelatinous mass and/or readily liberated from the water or the gel because of the low viscosity of the gel.

It is preferred to include additional filler materials in the sealing composition of the present invention to provide a more shrink-resistant, substantially incompressible cured sealing composition. For this purpose, any of a number of filler compositions have been found to be particularly effective. Useful fillers include water-insoluble particulate filler material having a particle size of about less than 500 microns, preferably 1 to 50 microns and a specific gravity in the range of 0.1 to 4.0, preferably 1.0 to 3.0. The filler content of the cured sealing composition of the present invention may be as much as 60 parts filler per 100 parts by weight cured sealing composition, preferably 5 parts to 20 parts per 100.

Other additive ingredients may be included in the sealing composition of the present invention. For example, viscosity modifiers may be included to increase or decrease the viscosity, depending on the desired result, to make the composition more adaptable to particular sealing equipment. Additionally, fungicides may be added to prolong the life of the gel and to prevent attack by various fungi. Other active ingredients may be added for various purposes, such as substances to prevent encroachment of plant roots, and the like. Care should be exercised in choosing fillers and other additives to avoid any materials which will have a deleterious effect on the viscosity, reaction time, and the stability of the gel being prepared.

TESTING

The compositions described in the Examples were tested for shrinkage and compressive strength as follows:

Shrinkage

The shrinkage was determined by measuring the percent volume reduction of molded rectangular (3 by 2 by ½ inch) test samples which had been permitted to dry in a forced air oven heated at 55° C. for one week. The percent shrinkage is the difference between the initial volume and the volume after drying divided by the initial volume times 100.

Compression

Wet and dry compression strength values were determined on molded cylindrical (2½ in dia. 3 in high) test samples by utilizing an Instron testing machine fitted with compression fittings on its movable arms. The arms were forced together against the opposed flat surfaces of the cylindrical test sample using a crosshead speed of one centimeter per minute and a chart speed of two centimeters per meter until the sample was compressed by 20% of its original thickness, at which time the compression force was measured in psi. Compression strength values were determined for both a wet (freshly prepared or stored in ambient water) test sample and for a dry (dried under ambient conditions for 4 days) sample.

The invention is further illustrated by the following examples, wherein all parts given are parts by weight, unless otherwise specified.

Prepolymers A–C, useful in the preparation of the sealing compositions and the practice of the method of the invention, are as follows:

Prepolymer A

Benzoyl chloride (0.58 g) was blended at room temperature under an inert atmosphere with 1738 g (1 equivalent) of an approximately 5000 M.W. polyether triol (a copolymer of ethylene oxide and propylene oxide having atactic distribution sold under the trade designation "Dow" XD 1421). Thereafter, 191.4 g (2.2 equivalents) of an 80:20 mixture of 2,4 tolylene diisocyanate: 2,6 tolylene diisocyanate was rapidly added to the resultant mixture with aggressive agitation, producing a moderate exotherm which was maintained at 80°–85° C. until the reaction was completed. The progress of the reaction was followed by titrating samples of the mixture until complete, whereupon the reaction was allowed to cool to room temperature. The upper portion of the reaction mixture was decanted to leave 100% solids prepolymer (hereinafter designated "Prepolymer A") which was dissolved in sufficient reagent grade acetone to provide 80% solids.

Prepolymer B

Benzoyl chloride (0.415 g) was added with thorough mixing at room temperature under an inert atmosphere to 1738 g (1 equivalent) of the polyether triol as described in above ("Dow" XD 1421). Thereafter, 337.5 g (2.5 equivalents) of a polymeric MDI polyisocyanate sold under the trade designation "Mondur" 432 was added to the resultant mixture with constant agitation producing an exotherm which was maintained at 80°–85° C. until the reaction was complete determined by titration. The reactants were permitted to cool to 40° C. or less, and the prepolymer reaction product (hereinafter designated "Prepolymer B") was then dissolved in sufficient reagent grade acetone to produce an 80% by weight solution of prepolymer.

Prepolymer C

A 4000 M.W. polyoxyethylene glycol 2000 g. (1 equivalent) was reacted with 1814 g (2.2 equivalents) of a 80:20 mixture of 2,4:2,6 tolylene diisocyanate, causing a slight exotherm which was maintained at 70°–75° C. until the reaction was completed as determined by titration. After cooling to room temperature, the prepolymer reaction product (hereinafter designated "Prepolymer C") was dissolved in reagent grade acetone to provide an 80% by weight prepolymer solution.

Latexes useful in the preparation of sealing compositions and in the practice of the method of the present invention, are as follows:

Polyethylacrylate Latex

This latex contained 25% solids and was prepared by polymerizing ethyl acrylate in the presence of sodium lauryl sulfate and potassium persulfate catalyst. The latex had an intrinsic viscosity of 2.78, contained polyethylacrylate having an average particle size in the range of 0.09 to 0.11 millimicrons, 0.7% by weight sodium lauryl sulfate and 0.08% by weight potassium persulfate.

Polyurethane Latex

This latex was prepared by polymerizing tolylene diisocyanate and dimethyl methylol propionic acid to produce a polyurethane which is free of functional groups except acid groups which were subsequently neutralized with triethylamine to provide water dispersibility. The latex also contained small amounts of phenolic antioxidant and substituted benzotriazole ultraviolet light absorber. The latex has 40% solids, an intrinsic viscosity of 0.78 and an average particle size of 0.1 microns.

Acrylonitrile-butadiene-styrene Copolymer Latex

This latex is commercially available as "Tylac" 69-026-8 and has 43% solids, an intrinsic viscosity of 0.4 and an average particle size of 0.1 micron.

CONTROL EXAMPLE AND EXAMPLES 1–6

The following examples were prepared and evaluated for shrinkage and compressive strength, as described above.

CONTROL EXAMPLE

The control example is a commercially available two-part sewer grouting material sold by American Cyanamid Corporation under the trade designation "AM-9". The "AM-9" composition consists of (Part A) containing an aqueous solution of 27.0% acrylamide and methylene-bis acrylamide and 1.1% dimethyl amino proprionitrile (DMAPN) reducing agent and (Part B) 2.2% aqueous solution of ammonium persulfate. Mixing the two parts in a 1:1 volume ratio as recommended by the manufacturer results in a cross-linked polyacrylamide gelled mass. The gelled mass had a compressive strength of 3 psi (wet) and 20 psi (dry) and a shrinkage of 95%.

EXAMPLE 1

| Part | Parts | Ingredients |
|---|---|---|
| A | 10 | Solution of 80% by weight Prepolymer A in acetone |
| B | 10 | Polyethylacrylate latex |
|   | 70 | Water |

Shrinkage: 62%
Compressive Strength: 20 psi (wet) 80 psi (dry)

EXAMPLE 2

| Part | Parts | Ingredients |
|---|---|---|
| A | 10 | Solution of 80% by weight Prepolymer A in acetone |
| B | 10 | Polyurethane latex |
|   | 70 | Water |

Shrinkage: 26%
Compressive Strength: 25 psi (wet) 110 psi (dry)

EXAMPLE 3

| Part | Parts | Ingredients |
|---|---|---|
| A | 10 | Solution of 80% by weight Prepolymer A in acetone |
| B | 10 | Acrylonitrile-butadiene-styrene latex |
|   | 70 | Water |

Shrinkage: 29%

EXAMPLE 4

| Part | Parts | Ingredients |
|---|---|---|
| A | 10 | Solution of 80% by weight Prepolymer A in acetone |
| B | 10 | Polyethylacrylate latex |
|   | 12 | Diatomaceous silica filler having a particle size range of 1 to 5 microns, specific gravity of 0.25 and being available under the trade designation "Celite" 292 |
|   | 70 | Water |

Shrinkage: 6%

EXAMPLE 5

| Part | Parts | Ingredients |
|---|---|---|
| A | 10 | Solution of 80% by weight Prepolymer A in acetone |
| B | 10 | Polyethylacrylate latex |
|   | 12 | Diatomaceous silica filler described in Ex. 4 |
|   | 70 | Water |

Shrinkage: 2%

EXAMPLE 6

| Part | Parts | Ingredients |
|---|---|---|
| A | 10 | Solution of 80% by weight Prepolymer B in acetone |
| B | 10 | Polyurethane latex |
|   | 7 | Air floated clay filler commercially available as "Huber" Hi-White R, having an average particle size of 1–8 microns and specific gravity of 2.6 |
|   | 70 | Water |

Shrinkage: 8%

EXAMPLE 7

| Part | Parts | Ingredients |
|---|---|---|
| A | 10 | Solution of 80% by weight Prepolymer B in acetone |
| B | 10 | Polyacrylate latex |
|   | 7 | Clay filler described in Ex. 6 |
|   | 70 | Water |

Shrinkage: 12%

EXAMPLE 8

| Part | Parts | Ingredients |
|---|---|---|
| A | 10 | Solution of 80% by weight Prepolymer A in acetone |
| B | 10 | Polyurethane latex |
|   | 7 | Clay filler described in Ex. 6 |
|   | 70 | Water |

Shrinkage: 16%

EXAMPLE 9

| Part | Parts | Ingredients |
|---|---|---|
| A | 10 | Solution of 80% by weight Prepolymer A in acetone |
| B | 10 | Polyurethane latex |
|   | 10 | Clayer filler described in Ex. 6 |
|   | 70 | water |

Shrinkage: 6%

EXAMPLE 10

To demonstrate the fact that the gel time of the sealing compositions according to the present invention may be adjusted, the following experiment was conducted. The gel time control agent solution (GTCA) consisted of a solution of 20% by weight dicyanoethylated polypropylene diamine sold under the trade designation "Jeffamine" CD-400 in water. The test sealing composition to which the gel time control agent was added was that described as Example 5. The table shows the gel time, i.e., the time in seconds required to reach maximum viscosity, as a function of the amount of volume of solution in parts by weight test sealing composition.

TABLE

| GTCA (ml) | Gel Time (sec) |
|---|---|
| 0 | 42 |
| 0.5 | 35 |
| 1.0 | 27 |
| 1.5 | 22 |
| 2.5 | 14 |

What is claimed is:

1. A method of sealing water-bearing or water-holding structures to prevent or inhibit leakage into or from said structures, comprising:

(A) substantially simultaneously applying at the locus of said leakage (1) a fluid mixture comprising water-soluble polyurethane prepolymer having terminal isocyanate groups formed by reacting
  (i) polyether polyol having at least two terminal hydroxyl groups and a number average molecular weight between about 3,000 and 20,000 and having random ethylene oxide units and higher alkylene oxide units in a mole ratio of ethylene oxide to higher alkylene oxide of 1:1 to 4:1, wherein said higher alkylene oxide is selected from a group consisting of propylene oxide, butylene oxide, pentylene oxide, hexylene oxide and mixtures thereof, and
  (ii) sufficient polyisocyanate compound having at least two terminal isocyanate groups to provide an NCO:OH ratio of about 5:1 to about 1.05:1;
(2) sufficient aqueous polymeric latex containing particulate polymeric material having an average particle size in the range of about 0.01 to about 10 microns to provide a weight ratio of prepolymer to polymeric material in latex form of about 100:1 to 1:1; and
(3) sufficient water to provide a weight ratio of water to prepolymer on the order of 5:1 to 20:1 and to provide a viscous mass having a viscosity in the range of about 5 to about 1,000 cps when measured with a Brookfield RVT Viscometer at 25° C. using a standard No. 3 spindle and rotated at 20 rpm
  (B) permitting the components to react.

2. The method of claim 1 wherein said structure is made of a siliceous material such as concrete.

3. The method of claim 1 wherein said structure is constructed of precast concrete to hold water and disposed within a normally or potentially water-bearing environment such as soil.

4. The method according to the method of claim 1 wherein said higher alkylene oxide is propylene oxide and said isocyanate is tolylene diisocyanate.

5. The method of claim 1 wherein the particulate polymeric material contained in said latex is selected from the group consisting of polyacrylate, polyurethanes, polyvinyl ethers, polyvinyl esters, polyolefin, polyamide, and polyoxiranes.

6. The gelled mass formed by the method of claim 1.

7. A water-bearing or water-holding structure having a leak sealed with the gelled mass of claim 6.

* * * * *